Aug. 27, 1968   J. A. WILLIS   3,398,862
LIQUID PROPORTIONING AND MIXING SYSTEM
Filed Nov. 28, 1966   2 Sheets-Sheet 1
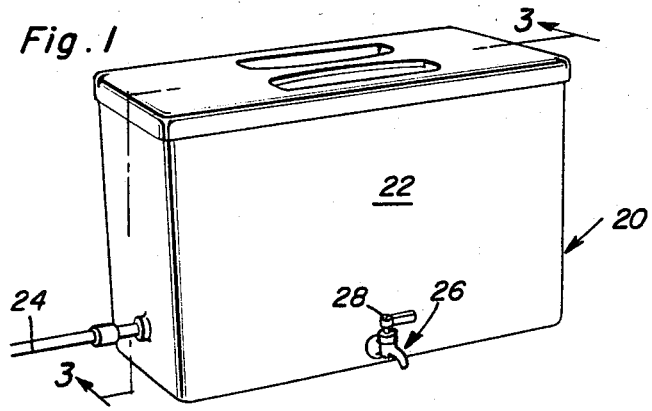
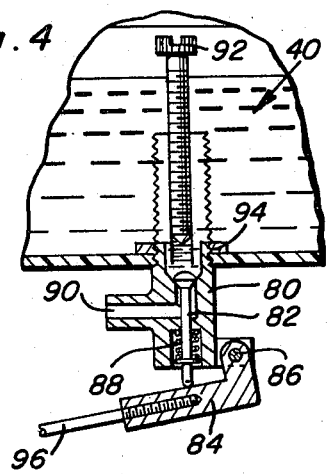
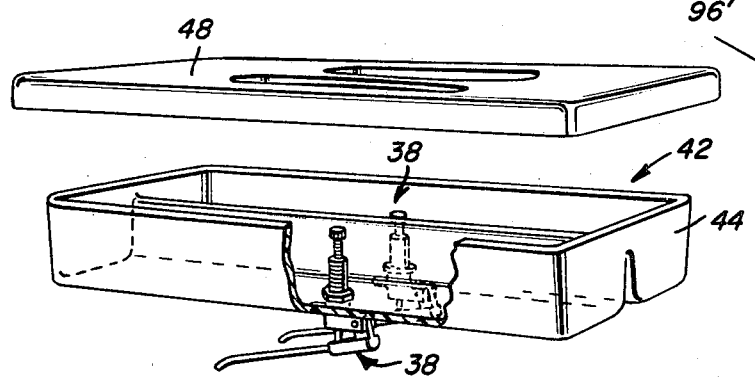
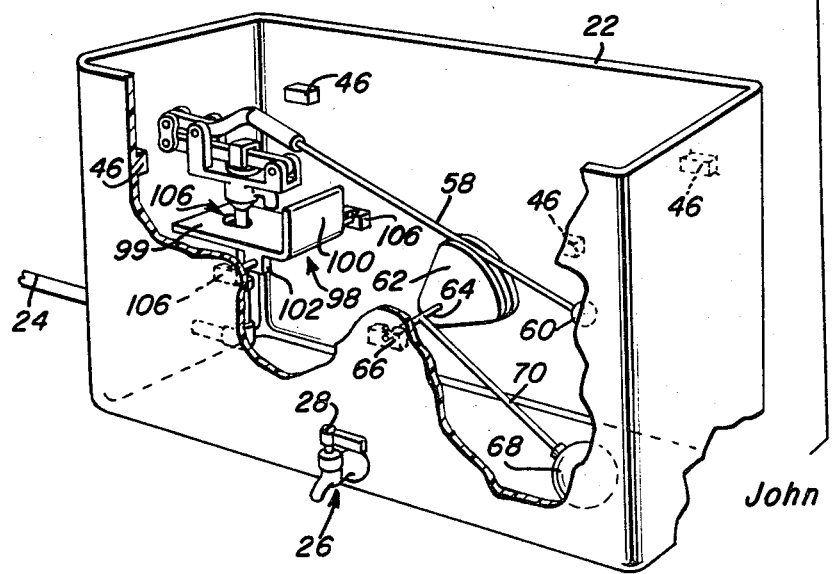
John A. Willis
INVENTOR.

Aug. 27, 1968   J. A. WILLIS   3,398,862
LIQUID PROPORTIONING AND MIXING SYSTEM
Filed Nov. 28, 1966   2 Sheets-Sheet 2
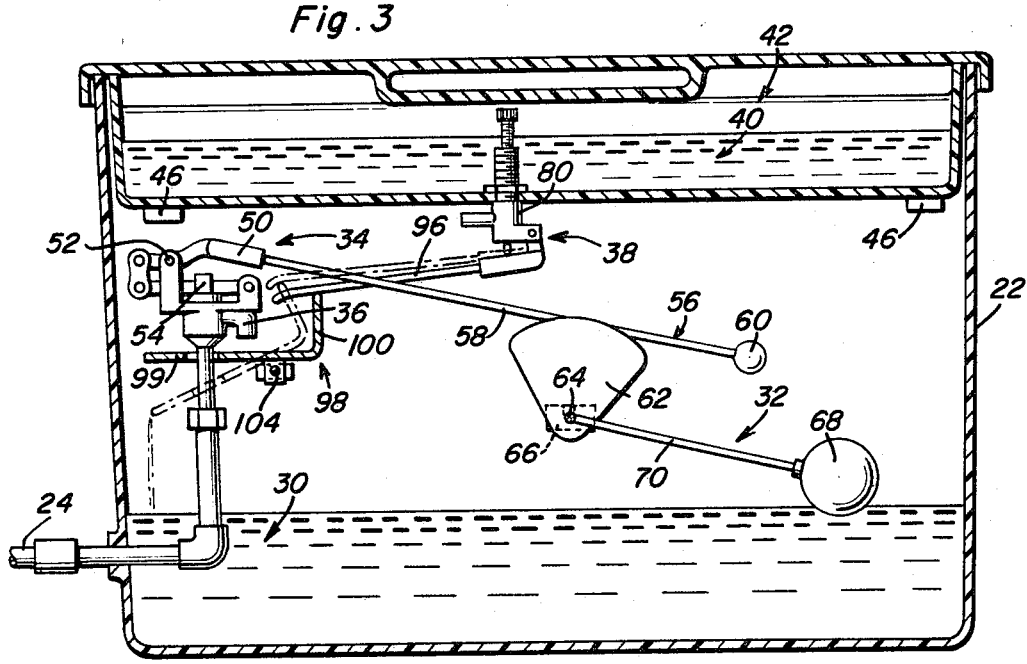
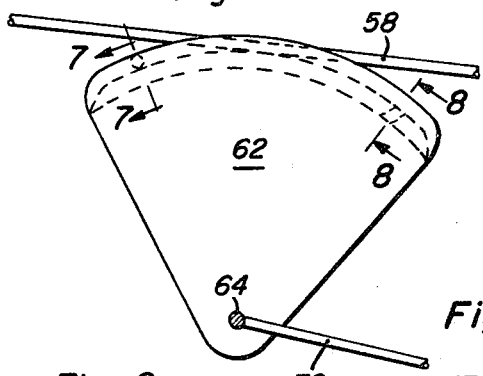
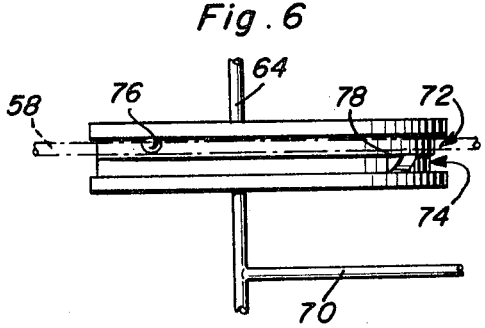
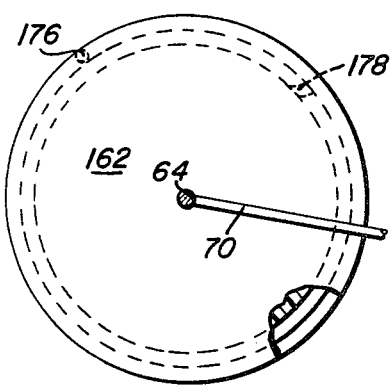
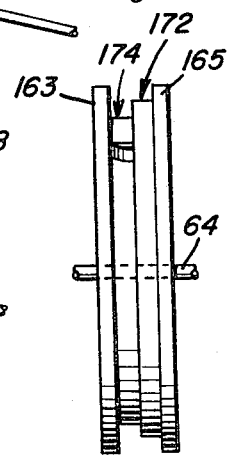
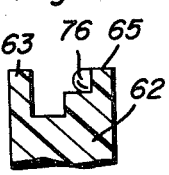
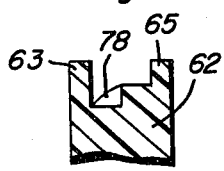
John A. Willis
INVENTOR.
BY *Clarence A. O'Brien*
*and Harvey B. Jacobson*
Attorneys United States Patent Office 3,398,862
Patented Aug. 27, 1968

3,398,862
LIQUID PROPORTIONING AND
MIXING SYSTEM
John A. Willis, San Antonio, Tex., assignor to The
Triplem Company, Inc., a corporation of Texas
Filed Nov. 28, 1966, Ser. No. 597,368
5 Claims. (Cl. 222—57)

ABSTRACT OF THE DISCLOSURE

A liquid handling device for proportionately admixing two or more liquids and including a float operated cam actuated liquid inlet means for one of the liquids. The liquid entering through the liquid inlet means impinges against and overbalances a lever means which is operatively connected to a normally closed valve means whereby the valve means is opened to proportionately admix another liquid with the liquid entering through the inlet valve means.

The present invention relates to a fluid actuated liquid proportioning and mixing apparatus and more particularly to a liquid level responsive liquid proportioning and mixing device adapted to mix two or more liquids in predetermined proportions so as to make available a substantially constant concentration effluent mixture.

Numerous liquid proportioning and mixing apparatuses have been proposed heretofore, however, they have been characterized by a number of inherent shortcomings, not the least of which is that their application is generally very limited due to the fact that they are either too complex or not readily adaptable to be utilized for a plurality of liquid proportioning operations. Furthermore, many such apparatuses proposed heretofore were constructed so as to require a substantially equal affluent and effluent to ensure their proper operation to proportion, mix and deliver solutions or mixtures of prefererd concentrations.

It is therefore a primary object of the present invention to provide a fluid activated, self-cycling liquid proportioning and mixing apparatus that will mix a preset amount of one or more liquid, chemical concentrates with a predetermined amount of affluent fluid to deliver a constant concentration effluent mixture as needed at point of use.

It is another object of the present invention to provide a novel liquid proportioning and mixing apparatus of the aforementioned type which by provision of a novel and efficient cam control means automatically recycles upon depletion of usable liquid mixture, while still delivering the constant concentration of affluent mixture to a point of use.

A further object of the present invention is to provide a novel construction for a liquid proportioning and mixing apparatus wherein a continuous affluent flow actuated by depletion of the fluid level in a holding tank will activate a control member operatively associated with a control cam to replenish the proportioned mixture within the holding tank.

A still further object of the present invention is to provide a novel construction for a liquid proportioning and mixing apparatus which utilizes a self-contained, self-cycling means to mix one or more fluid concentrates in selectively variable proportions with an affluent liquid entering a solution mixing and holding tank for delivery of the mixture to a point of use.

Still a further object of the present invention is to provide a novel construction for a liquid proportioning and mixing apparatus wherein flow of an affluent liquid triggers the direct influx of fluent additives that sets up a hydroagitation to assure substantially uniform admixture of the affluent liquid and the fluent additives thus providing a continuous flow, self-contained, self-cycling proportioning device that mixes a predetermined amount of one or more medicinal, therapeutic, prophylatic, dietetic or other additive agents with an affluent fluid such as water.

Still a further object of the present invention is to provide a novel construction for a liquid proportioning and mixing apparatus wherein a float operated cam means is provided to simultaneously and selectively control the filling of a reservoir tank and thereby trigger an additive dispensing means adapted to selectively and proportionally dispense an additive to be admixed with the fluid within the reservoir tank.

Still a further object of the present invention is to provide a novel liquid proportioning and mixing apparatus of the aforementioned type which is adapted to simultaneously admix a plurality of fluent treating agents with a diluent liquid.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an exemplary embodiment of a liquid proportioning and mixing apparatus produced in accordance with the principles of the present invention;

FIGURE 2 is an enlarged, partially exploded perspective view of the device of FIGURE 1 with portions thereof broken away to show certain interior details;

FIGURE 3 is an enlarged vertical longitudinal cross-sectional view of the device of FIGURE 1 taken substantially along the plane of the line 3—3 of FIGURE 1;

FIGURE 4 is an enlarged fragmentary vertical sectional view of a portion of the means utilized to dispense a fluent substance to be added to an affluent fluid;

FIGURE 5 is an enlarged fragmentary elevational view of one embodiment of a cam means utilized to selectively control the level of affluent liquid in the device of FIGURE 1;

FIGURE 6 is a fragmentary top plan view of the cam means of FIGURE 5;

FIGURE 7 is an enlarged fragmentary transverse vertical sectional view taken substantially along the plane of the line 7—7 of FIGURE 5;

FIGURE 8 is an enlarged fragmentary transverse vertical sectional view taken substantially along the plane of the line 8—8 of FIGURE 5;

FIGURE 9 is a fragmentary side elevational view of another embodiment of a cam means which may be utilized in place of the cam means illustrated in FIGURE 5; and FIGURE 10 is a side elevational view of the cam means of FIGURE 9.

Referring now to the drawings and particularly FIGURES 1–3 it will be seen that the exemplary embodiment of a liquid proportioning and mixing apparatus 20 illustrated therein comprises a holding tank or reservoir means 22 of a size commensurate with the amount of proportionately mixed effluent fluid to be dispensed therefrom. The holding tank 22 is provided with an affluent or inlet fluid conduit 24 such as connected to a source of water under line pressure for example and a proportioned and mixed effluent or fluid outlet means 26 such as comprising a manually operable faucet 28, for example. The level of the fluid within the tank 22, such as water, for example, indicated at 30 is controlled between predetermined maximum and minimum limits by float control means 32 operatively associated with a conventional antisiphon float controlled valve means 34 of a type conventionally utilized in conjunction with toilet water closets, for example, and carried by the inlet conduit 24 so as to selectively permit the introduction of fluid into the holding tank 20 from the inlet conduit 24.

When the float control means 32 drops to a predetermined lower fluid level it actuates the float controlled valve means 34 to permit discharge of fluid from the outlet 36 so as to actuate a dispensing means 38 to proportionately dispense fluent additive material indicated at 40 within an additive holding tank means 42 so as to be proportionately mixed with the affluent fluid to make up a supply of the proportionately mixed fluid 30 so as to provide a constant source of proportionately admixed effluent at the outlet means 26. In the exemplary embodiment illustrated it will be noted that the additive holding tank means 42 comprises a dual compartmented tank 44 supported from and within the upper portion of the tank 22 by a plurality of inwardly projecting lugs 46 integral with the tank 22. The open tops of the tanks 22 and 44 are simultaneously closed by a cover 48.

Referring again to the float control means 32 and its operative connection with the float controlled inlet valve means 34 it will be seen that the valve actuating lever 50 which pivots about the axes 52 to reciprocate the valve element 54 is provided with a cam follower means 56 comprising an elongated rigid rod 58 threadably or otherwise rigidly secured to the valve actuating lever 50 and provided with a bulbous weighted end 60 so as to ensure positive sliding contact with a rotatably mounted cam member 62 comprising a portion of the float control means 32 and mounted on a rigidly secured supporting shaft 64 rotatably journaled in suitable journal lugs 66 integral with the tank 22. The cam member 62 is non-rotatably fixed to the shaft 64 so as to permit limited oscillatory movement of the cam member 62 about the axis provided by the shaft 64. The oscillatory movement of the cam is accomplished by a float member 68 having a float rod 70 rigidly secured to the float 68 and the shaft 64. As seen best in FIGURES 5–8 the cam member 62, on the upper arcuate suface thereof, is provided with at least a pair of cam surfaces comprising an upper cam surface indicated at 72 and a lower cam surface indicated at 74 bordered by guide rails 63 and 65. The cam follower rod 58 normally rides on either the cam surface 72 or 74, and as will be described in further detail hereinafter, is automatically switched between the respective cam surfaces upon oscillatory movement of the cam member 62. More specifically the cam follower rod 58 is shifted from the high cam surface or track 72 into the low cam surface or track 74 by a shift button 76 as seen best in FIGURE 7. As seen best in FIGURE 8 the cam follower rod 58 upon counterclockwise movement of the cam member 62 is shifted from the low cam surface or track to the high cam surface or track by a transverse cam flange 78. The purpose for shifting of the cam follower rod will become apparent hereinafter during a discussion of the operation of the proportioning and mixing apparatus 20. In FIGURES 9 and 10 it will be seen that the embodiment of the cam member 162 illustrated therein is essentially equivalent to the cam member 62 except that the body of the cam member is of a circular rather than a triangular configuration and as with the cam member 62 is provided with a pair of cam surfaces or tracks namely an upper cam track 172 and a lower cam track 174 as well as cam track shifting means comprising a high to low shift button 176 and a low to high track cam 178. The cam member 162 also is provided with upstanding guide rail portions 163 and 165 to prevent the cam follower rod 58 from dropping off the cam. Although not shown, it will be appreciated that the embodiment 162 of the cam means is fabricated as a circle so that the cam shifting elements 176 and 178 may be moved to regulate the amount of affluent liquid introduced into the tank 22 during each cycle of the apparatus as will become apparent hereinafter.

Referring to FIGURES 2–4 it will be seen that the additive dispensing means 38 includes a normally closed spring-biased lever-operated dispensing valve 80 including a reciprocating valve element 82 actuated by a valve operating lever 84 pivoted as at 86 to the body of the valve 80 whereby clockwise rotation of the actuating lever 84 about the pivot 86 moves the valve element 82 upwardly against the bias of a spring 88 permitting additive 40 to flow from the additive holding tank means 42 outwardly through a valve outlet 90 of the valve 80. The upward travel of the valve element 82, and consequently the amount of additive 40 permitted to flow from the tank means 42 may be controlled by a metering means comprising a threadably received finger operated screw 92 adapted to be adjusted to selectively limit the travel of the valve element 82. As best seen in FIGURE 4 the above described portion of the additive dispensing means is secured in a suitable aperture in the underside of the tank means 42 by a fastener such as a nut 94 or the like threadably received on the body of the valve 80 whereby the valve 80 is sealingly secured in a lower wall of the additive tank means 42. The valve actuating lever 84 includes a threadably received rigid valve actuating lever extension rod 96 which rides on an inlet fluid actuated additive dispensing valve actuating means indicated at 98 which as best seen in FIGURE 2 comprises a rectangular actuating member 99 having an upturned flange 100 upon which the extension rod 96 is adapted to rest. The additive dispensing or actuating means in the embodiment illustrated includes integral downwardly projecting lugs 102 through which passes a shaft 104 rotatably journaled in journal lugs 106 secured to or integral with the tank 22. The downwardly projecting lugs 102 are positioned intermediate of the ends of the actuating member 98 so as to balance the member 98 to remain at rest in the position seen in FIGURE 3 wherein the valve 80 is in an off position. As best seen in FIGURE 2 the member 98 is provided with an aperture 106 adjacent one end so as to permit the standpipe of the inlet valve means 34 to project upwardly therethrough. It will further be noted that the aperture 106 is sized so as to permit relatively free oscillatory movement of the member 100 about the axis provided by the shaft 104, as may be seen from the phantom line position shown in FIGURE 3 whereby water discharging from the outlet 36 of valve means 34 impinges against the element 100 overbalancing it into the position shown in phantom lines whereby the upturned portions of the flange portion 100 of the member 98 urges the valve actuating lever extension rod 96 upwardly to urge the valve element 82 against the bias of spring 88 and dispense a controlled amount of additive 40 into the tank 22 through the valve outlet 90. As seen in FIGURE 2 the additive holding tank means 42 may include a plurality of additive dispensing means 38 substantially analogous to that described hereinabove. It will be thus appreciated that the upturned flange 100 of the element 98 would support a valve actuating lever extension rod for each of the additive dispensing valves 80 utilized.

Referring now in further detail to the operation of the liquid proportioning and mixing apparatus 20 and assuming that a supply of proportioned and mixed liquid 30 is presently in the tank 22, it will be seen that as the mixed liquid 30 is dispensed through the faucet 28 the liquid level in the tank 22 drops and when the float element 68 drops a sufficient distance to rotate the cam element 62 clockwise so that the shift button 76 shifts the cam follower rod 58 from the high cam track 72 to the low cam track 74 the valve actuating lever 50 will drop sufficiently to open the valve element 54 of the inlet valve means 34 to permit water from the conduit 24 to enter the tank 22 through the valve outlet 36. In doing so the water discharging from the valve outlet 36 impinges against the additive dispensing valve actuating member 98 causing it to overbalance and rotate in a counterclockwise direction, as seen in FIGURE 3, whereby the additive dispensing valve actuating lever extension 96 will be pivoted in a clockwise direction about the pivot 86 so as to dispense additive 40 from the additive tank means 42 as described hereinabove. As the water rushing into the tank 22 through the top outlet 36 cascades down it creates a relatively violent hydroagitation effect which effectively mixed the additive 40 and water so as to constantly provide a mixed fluid 30 of predetermined proportions.

As the float 68 rises in response to the filling of the tank 22, and consequently pivots the cam element 62 in a counterclockwise direction of rotation about the axis provided by shaft 64, the cam follower rod 68 will continue to ride the lower cam track 74 until such time as the cam element 62 rotates sufficiently so as to bring the low to high cam member 78 into contact with the cam follower rod 58 whereby the rod will be shifted from the low to the high cam surface 52 and thus pivot the valve actuating lever 50 about its pivot point 52 to close the valve element 54 at which time the additive dispensing valve actuating member 98, in the absence of any incoming fluid impinging thereon, will return to the full line position shown in FIGURE 3 whereby the additive dispensing valve 80 is permitted to be closed by the bias of spring 88. It will therefore be appreciated that as the fluid level again begins to drop in the tank 22 by virtue of mixed fluid 30 being drawn out through the dispensing faucet 28 the cam follower rod 58 will ride in the upper or high cam track 72 until such time as the cam 62 rotates sufficiently in a clockwise direction to shift the follower rod 58 into the low cam track as described hereinabove so as to put the liquid proportioning and mixing apparatus 20 through another filling cycle.

Although not indicated heretofore it will nevertheless be appreciated that the components comprising the liquid proportioning and mixing apparatus 20 are preferably, as far as possible, fabricated from relatively noncorrodible and otherwise relatively chemically inert materials so as to render the apparatus suitable for the proportionate mixing and dispensing of fluids of diverse natures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In a liquid proportioning and mixing apparatus the combination comprising a plurality of reservoirs corresponding in number to the number of liquids to be proportionately mixed, a float controlled inlet valve means including a float means adapted to maintain a liquid level between predetermined limits within one of said reservoirs, cam means operatively carried by said float means, said cam means being adapted to intermittently control the inlet of liquid into said one of said reservoirs in response to the position of said float means, means interposed in the path of and responsive to liquid entering said one of said reservoirs through said inlet valve means for communicating at least two of said reservoirs to proportionately admix liquids from at least one of another of said plurality of said reservoirs with the liquid in said one of said reservoirs, said communicating means including normally closed valve means carried by said at least one of said plurality of said reservoirs, said communicating means also including lever means interposed in the path of liquid entering said one of said reservoirs, said lever means being overbalanced by the entering liquid and opening said normally closed valve means, and proportionately mixed liquid delivery outlet means provided in said one of said reservoirs.

2. In a liquid proportioning and mixing apparatus the combination comprising a first reservoir and at least a second reservoir, float controlled inlet valve means positioned within said first reservoir and adapted to maintain a liquid level between predetermined limits within said first reservoir from a source of liquid under pressure, said inlet valve means including a float member and a float member controlled inlet valve, cam means operatively associated with and movable by said float member of said inlet valve means, said cam means being adapted to control the flow of liquid into said first reservoir, an additive dispenser means operatively associated with said second reservoir and adapted to dispense an additive from said second reservoir into said first reservoir, means responsive to the flow of liquid into said first reservoir for actuating said dispenser means to accurately proportion and mix a plurality of liquids, said cam means comprising a cam member rotatably journaled within said first reservoir, said float means including a float rod having one end rigidly secured to said cam member, a float secured to the other end of said float rod whereby movement of said float in response to a change of the liquid level in said first reservoir effects oscillatory movement of said cam member, said cam member being provided with a plurality of cam tracks, a cam follower rod adapted to ride on said cam tracks, said cam follower rod being operatively associated with said inlet valve whereby oscillatory movement of said cam member controls the inflow of liquid into said first reservoir.

3. The combination of claim 2 wherein said cam member comprises a segment of a planar disk having an arcuate outer edge, said arcuate outer edge of said cam member being provided with a pair of radially spaced peripherally extending cam tracks, and cam track switching means carried by said cam member and adapted to switch said cam follower rod between said cam tracks at a point in the oscillatory movement of said cam member corresponding to preselected minimum and maximum desired fluid levels in said first reservoir.

4. The combination of claim 2 wherein said cam member comprises a planar circular disk, the periphery of said cam member being provided with a pair of radially spaced peripherally extending cam tracks and cam track switching means carried by said cam member and adapted to switch said cam follower rod between said cam tracks at a point in the oscillatory movement of said cam member corresponding to preselected minimum and maximum desired fluid levels in said first reservoir.

5. In a liquid proportioning and mixing apparatus the combination comprising a first reservoir and at least a second reservoir, float controlled inlet valve means positioned within said first reservoir and adapted to maintain a liquid level between predetermined limits within said first reservoir from a source of liquid under pressure, said inlet valve means including a float member and a float member controlled inlet valve, cam means operatively associated with and movable by said float member of said inlet valve means, said cam means being adapted to control the flow of liquid into said first reservoir, an additive dispenser means operatively associated with said second reservoir and adapted to dispense an additive from said second reservoir into said first reservoir, means responsive to the flow of liquid into said first reservoir for actuating said dispenser means to accurately proportion and mix a plurality of liquids, said additive dispenser means including an additive dispensing valve means carried by said second reservoir and additive valve operating means adapted to meter additive from said second reservoir into said first reservoir in response to liquid entering said first reservoir through said inlet valve, said additive valve operating means including lever means interposed in the path of liquid entering said first reservoir through said inlet valve whereby liquid entering said first reservoir impinges against said lever means to actuate said additive dispenser valve to dispense additive into said first reservoir to be admixed with the liquid entering said first reservoir.

References Cited

UNITED STATES PATENTS

| | | | |
|---|---|---|---|
| 1,182,742 | 5/1916 | Bickerton | 4—227 |
| 2,533,930 | 12/1950 | Harr | 222—57 |
| 2,993,214 | 7/1961 | Franco | 4—228 |
| 3,105,245 | 10/1963 | Finkbinder | 4—228 |
| 3,187,947 | 6/1965 | Ellis | 222—57 |

WALTER SOBIN, *Primary Examiner.*